United States Patent
Al-Jawad et al.

(10) Patent No.: US 11,365,345 B2
(45) Date of Patent: Jun. 21, 2022

(54) METHOD OF IMPROVING ROCK HARDNESS IN CARBONATE FORMATIONS

(71) Applicant: King Fahd University of Petroleum and Minerals, Dhahran (SA)

(72) Inventors: Murtada Al-Jawad, Dhahran (SA); Mahmoud Desouky, Dhahran (SA); Theis Solling, Dhahran (SA); Khalid Alramadan, Dhahran (SA); Abduljamiu Amao, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 121 days.

(21) Appl. No.: 16/784,942

(22) Filed: Feb. 7, 2020

(65) Prior Publication Data
US 2021/0246363 A1 Aug. 12, 2021

(51) Int. Cl.
*C09K 8/80* (2006.01)
*C09K 8/86* (2006.01)
*C09K 8/94* (2006.01)

(52) U.S. Cl.
CPC ............. *C09K 8/80* (2013.01); *C09K 8/86* (2013.01); *C09K 8/94* (2013.01); *C09K 2208/10* (2013.01)

(58) Field of Classification Search
CPC .... C09K 2208/10; C09K 8/5045; C09K 8/72; C09K 8/80; C09K 8/94; C09K 8/86
See application file for complete search history.

(56) References Cited

U.S. PATENT DOCUMENTS

| 4,844,164 | A | * | 7/1989 | Shen ..................... C09K 8/42 166/291 |
| 7,527,102 | B2 | | 5/2009 | Crews et al. |
| 8,371,384 | B2 | | 2/2013 | Rickman et al. |
| 8,397,812 | B2 | | 3/2013 | Huang et al. |
| 2021/0108493 | A1 | * | 4/2021 | Ye ..................... C09K 8/516 |

FOREIGN PATENT DOCUMENTS

| WO | 2008/117222 A1 | 10/2008 |
| WO | 2015/080713 A1 | 6/2015 |

OTHER PUBLICATIONS

Lopez-Arce, et al. ; Influence of relative humidity on the carbonation of calcium hydroxide nanoparticles and the formation of calcium carbonate polymorphs ; Consolider-Ingenio 2010 programme (CSD2007-0058) ; 21 Pages.
Chelazzi, et al. ; Hydroxide nanoparticles for cultural heritage: Consolidation and protection of wall paintings and carbonate materials ; Journal of Colloid and Interface Science ; 2012 ; 8 Pages.

(Continued)

*Primary Examiner* — Frances Tischler
(74) *Attorney, Agent, or Firm* — Oblon, McClelland, Maier & Neustadt, L.L.P.

(57) ABSTRACT

A method is described for strengthening a carbonate formation rock within a subterranean formation. The method involves contacting the rock with a composition of $Ca(OH)_2$ nanoparticles in an organic solvent, which results in a treated rock having a Young's modulus that is increased by at least 10%. The composition may optionally comprise a $CO_2$ source.

20 Claims, 9 Drawing Sheets

(56) References Cited

OTHER PUBLICATIONS

Taglieri, et al. ; Nano Ca(OH)2 synthesis using a cost-effective and innovative method: Reactivity study ; Journal of the American Ceramic Society ; Aug. 2017 ; 14 Pages.
Coltelli, et al. ; Preparation of Water Suspensions of Nanocalcite for Cultural Heritage Applications ; MDPI nanomaterials ; Apr. 19, 2018 ; 20 Pages.
Giorgi, et al. ; Nanoparticles for Cultural Heritage Conservation: Calcium and Barium Hydroxide Nanoparticles for Wall Painting Consolidation ; Chemistry: A European Journal ; pp. 9374-9382 ; 2010 ; 9 Pages.
Lopez-Arce, et al. ; Consolidation of Carbonate Stones With Nanoparticles ; Proceedings of Monubasin ; 2010 ; 11 Pages.
Lopez-Arce, et al. ; Influence of porosity and relative humidity on consolidation of dolostone with calcium hydroxide nanoparticles: Effectiveness assessment with non-destructive techniques ; Materials Characterization 61 ; pp. 168-184 ; Nov. 17, 2009 ; 17 Pages.

\* cited by examiner

METHOD OF IMPROVING ROCK HARDNESS IN CARBONATE FORMATIONS

BACKGROUND OF THE INVENTION

Technical Field

The present invention relates to method of increasing rock hardness in carbonate fractured formations by contacting a carbonate formation rock with a composition.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Hydraulic fracturing is a widely applied stimulation technique in tight formations. The technology is based on injecting a proppant slurry to hold the fracture open. This results in a conductive path from which the reservoir fluids (e.g., hydrocarbons) flow to the fracture and finally to the wellbore. One major challenge that faces this technology is proppant embedment, especially in ductile and soft formations. This results in substantial reduction of the fracture conductivity and hence wellbore productivity.

To unlock gas and oil reserves in tight shale formations, hydraulic fracturing with proppant is widely performed. Viscous fracturing fluids are pumped at high pressure to initiate and propagate fractures. Then proppants, which are small sand or bauxite particles, are pumped into cracks formed by the fracturing in the formation to keep the fracture open. Producing from low permeability formations is not economical without intensive fracturing. The fractured well performance is determined by the fracture length and conductivity. Fracture conductivity is defined as the product of the created fracture width and permeability. Hence, predicting fracture conductivity is essential to determine the viability of developing a shale formation.

Proppant embedment (see FIG. 1) and crushing are two main reasons for conductivity reduction which was first investigated by Huitt and McGlothlin. See Huitt, J. L., & McGlothlin Jr, B. B. (1958, January). The propping of fractures in formations susceptible to propping-sand embedment. In *Drilling and Production Practice*. American Petroleum Institute. Proppant embedment results in fracture width reduction and formation damage; and Wen, Q., Zhang, S., Wang, L., Liu, Y., Li, X. (2007). The effect of proppant embedment upon the long-term conductivity of fractures. Journal of Petroleum Science and Engineering 55(3-4): 221-227—each incorporated herein by reference in its entirety. Lately, Alramahi and Sundberg (2012) studied the rock mineral composition effect on the degree of embedment. See Alramahi, B., Sundberg, M. I. (2012). Proppant Embedment and Conductivity or Hydraulic Fractures in Shales. US Rock Mechanics/Geomechanics Symposium. Chicago, Ill. 2012. Copyright 2012, American Rock Mechanics Association—incorporated herein by reference in its entirety. The outcome of their study showed that high clay content and low Young's modulus of rocks result in high proppant embedment on fracture surfaces. However, large quartz content in shale increases brittleness and hence, decreases embedment. See Rickman, R., et al. (2008, Jan. 1). A Practical Use of Shale Petrophysics for Stimulation Design Optimization: All Shale Plays Are Not Clones of the Barnett Shale. Society of Petroleum Engineers. doi:10.2118/115258-MS—incorporated herein by reference in its entirety. Fluid interactions with the formation and proppant are also believed to affect conductivity. Clay swelling and proppant plugging by viscous fluid residue are major factors for conductivity reduction.

Rock mechanical properties are studied extensively to understand how they affect conductivity. Brinell hardness, for instance, is investigated by Ramurthy et al. (2011), Mueller and Amro (2015). See Ramurthy, M., Barree, R. D., Kundert, D. P., Petre, J. E., & Mullen, M. J. (2011). Surface-area vs. conductivity-type fracture treatments in shale reservoirs. SPE production & operations, 26(04), 357-367; and Mueller, M., Amro, M. (2015). Indentation Hardness for Improved Proppant Embedment Prediction in Shale Formations. SPE European Damage Conference and Exhibition. Budapest, Hungary. Copyright 2015, Society of Petroleum Engineers—each incorporated herein by reference in its entirety. From Brinell hardness measurement, estimation of proppant embedment can be determined. Surface roughness is also found to be a major factor determining closure behavior. Soft fracture surfaces close the easiest, resulting in sharp conductivity reduction. See Barton, N. R., et al. 1985. Strength, deformation and conductivity coupling of rock joints. International Journal of Rock Mechanics and Mining Sciences & Geomechanics; and Makurat, A. et al. 1996. Fracture Flow and Fracture Cross Flow Experiments. Society of Petroleum Engineers. SPE Annual Technical Conference and Exhibition, Denver, Colo. 1996. SPE-36732-MS. DOI: 10.2118/36732-MS—each incorporated herein by reference in its entirety.

Acid fracture is a well stimulation method applied to carbonate formations in order to improve well productivity. Acid reacts with the formation, creating channels and asperities that hold the fracture open. The conductive path created by the acid improves fluid transport from the reservoir to the wellbore. After a while, the conductive path closes as the asperities holding the fracture open crush and creep because of high formation stress. It is observed that soft rocks suffer the most from sharp fracture conductivity decline.

To increase well production, acid fracturing is a potential stimulation method especially in tight heterogeneous carbonate formations. Acid fracturing operations include injecting a viscous pad (non-reactive) fluid at high pressure to initiate and propagate a fracture. Then, acid is injected to etch the fracture walls in non-uniform patterns. In many cases, acid and pad fluids are injected in alternating stages to reduce fluid loss. Diverters may also be injected between different stages to plug high permeability zones such as wormholes and natural fractures. A water flush is usually the final stage, because it reduces equipment corrosion by driving the acid deeper inside the fracture. When fluid injection stops, the fracture pressure drops as fluids leak out; this allows for fracture closure. However, asperities and channels created at the fracture surfaces from the acid differential etching prevent the fracture from closing completely (see FIG. 2). The result is a conductive path along which reservoir fluids can flow from the formation's matrix to the wellbore.

The performance of an acid fractured well depends on the fracture conductivity and acid penetration length. Nierode and Kruk (1973) demonstrated through experimental measurements that acid fracture conductivity declines exponentially with the increase in formation closure stress. See Nierode, D. E. and Kruk, K. F. 1973. An Evaluation of Acid Fluid Loss Additives, Retarded Acids, and Acidized Fracture Conductivity. Presented at the SPE Annual Fall Meeting, Las Vegas, Nev., 30 September-3 October. SPE-4549-MS—incorporated herein by reference in its entirety. However, the rate of decline can be less severe in hard rocks, considering that the fracture surface asperities will be more rigid. This means that the voids and channels created by acid dissolution will be maintained after closure, resulting in higher conductivity. Abass et al. (2006) investigated the effect of creeping on the acid fracture conductivity. See Abass, Hazim Hussein, et al. "Acid fracturing or proppant fracturing in carbonate formation? A rock mechanics view." SPE Annual Technical Conference and Exhibition. Society of Petroleum Engineers, 2006—incorporated herein by reference in its entirety. They concluded that acid weakens the asperities at the fracture surface, and only strong contact points will maintain the conductivity at high closure stresses. It was observed that acid fracturing chalk formations may not be suitable due to the softness of such rocks. Naser-El-Din et al. (2006) found that the rock strength reduction because of acid reaction is more significant in limestone than dolomite rocks. See Nasr-El-Din, H. A., Al-Driweesh, S. M., Metcalf, A. S., and Chesson, J.: "Fracture Acidizing: What Role Does Formation Softening Play in Production Response?" paper SPE 103344 presented at the 2006 SPE Annual Technical Conference and Exhibition, San Antonio, Tex., 24-27 September—incorporated herein by reference in its entirety.

In view of the forgoing, one objective of the present invention is to sustain acid fractured rock conductivity by improving fractured rock hardness by contacting the rock with a composition of $Ca(OH)_2$ nanoparticles in an organic solvent.

BRIEF SUMMARY OF THE INVENTION

According to a first aspect, the present disclosure relates to a method for treating a subterranean carbonate formation. The method comprises contacting a carbonate formation rock within the formation with a composition comprising nanoparticles of $Ca(OH)_2$ dispersed in an organic solvent. This contacting forms a treated rock having a hardness that is at least 10% greater than the carbonate formation rock.

In one embodiment, the hardness is 12-80% greater than the formation rock.

In one embodiment, the composition comprises the nanoparticles at a concentration in a range of 10-50 g/L.

In one embodiment, the nanoparticles are in the form of hexagonal nanoplatelets.

In one embodiment, the treated rock has a permeability that is decreased by 40-80% relative to a permeability of the carbonate formation rock.

In one embodiment, the nanoparticles have an average longest dimension in a range of 70-120 nm.

In one embodiment, the contacting is maintained for a time period of 12-72 h.

In one embodiment, the organic solvent is isopropanol, methanol, and/or ethanol.

In one embodiment, the composition further comprises a proppant.

In one embodiment, the composition further comprises a surfactant.

In one embodiment, the composition further comprises a carbonate.

In one embodiment, the composition further comprises $CO_2$.

In one embodiment, the composition further comprises foamed $CO_2$.

In one embodiment, the composition does not contain water.

In one embodiment, the composition does not comprise $CO_2$.

In one embodiment, the method further comprises acid fracturing the carbonate formation rock before the contacting.

In one embodiment, the composition consists of the nanoparticles of $Ca(OH)_2$ and the organic solvent.

In one embodiment, the carbonate formation rock comprises at least 85 wt % calcium carbonate relative to a total weight.

In one embodiment, the carbonate formation rock has a permeability in a range of 4-10 mD.

In one embodiment, the carbonate formation rock has a permeability in a range of 8-22 mD.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
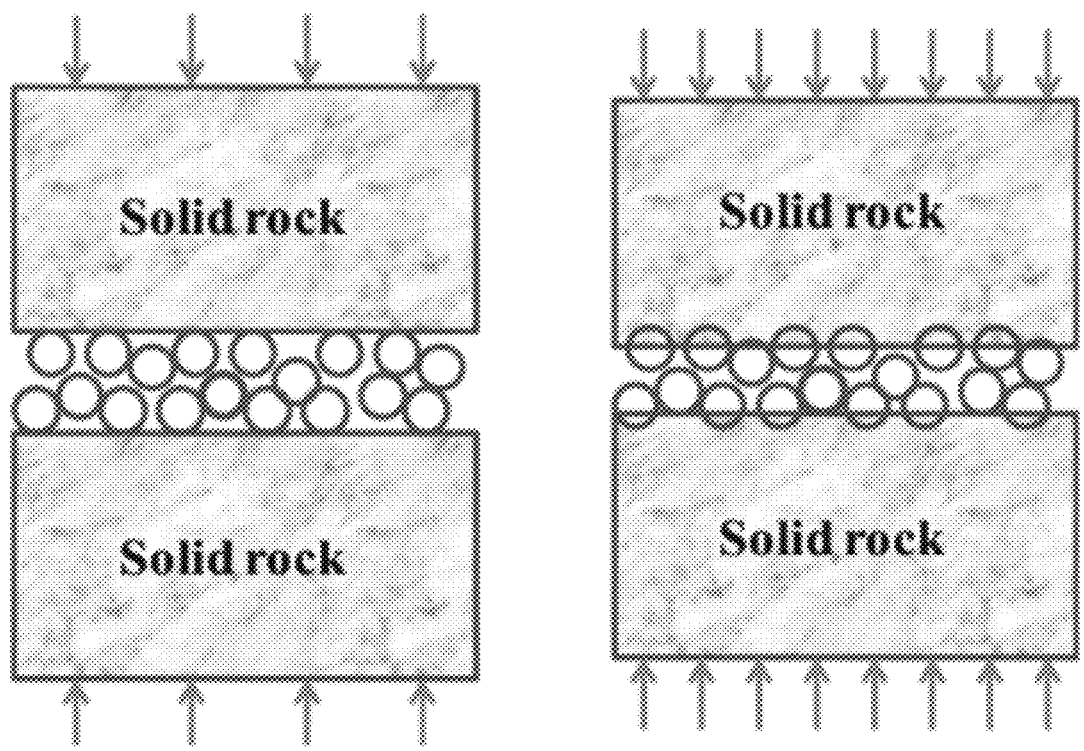
FIG. 1 shows proppant embedment on a fractured rock surface.
Figure 2:
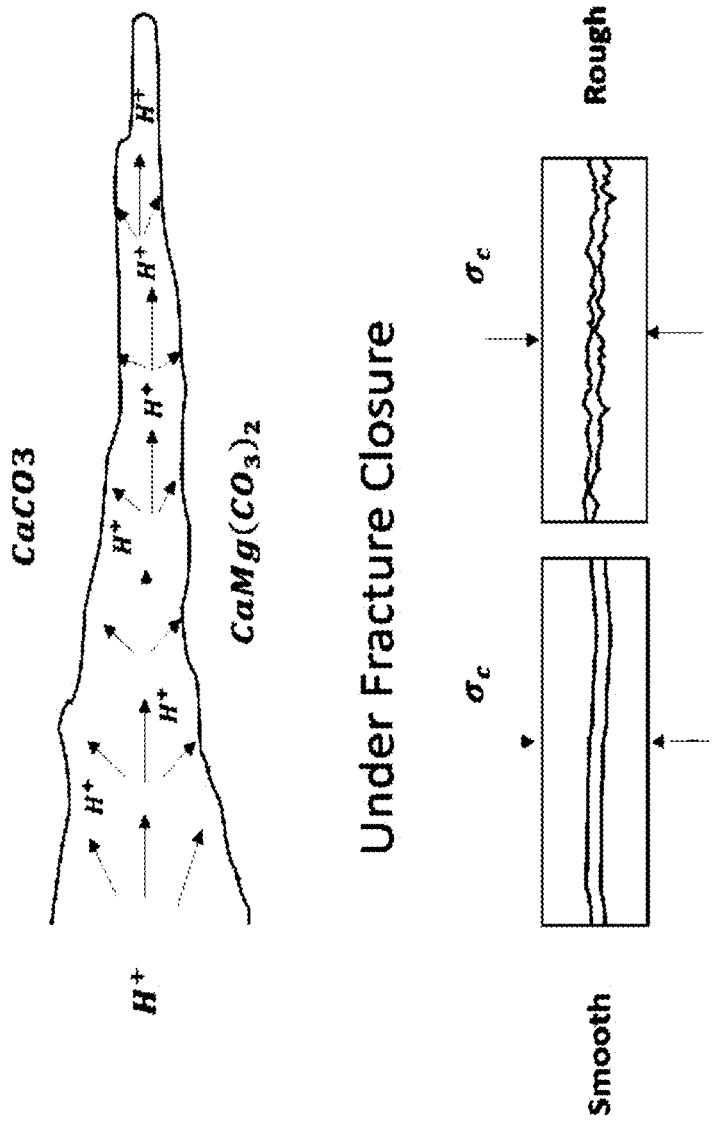
FIG. 2 is a schematic of fracture walls being subjected to acid etching and then subjected to closure stress.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The present disclosure is intended to include all hydration states of a given compound or formula, unless otherwise noted or when heating a material. For example, $Ni(NO_3)_2$ includes anhydrous $Ni(NO_3)_2$, $Ni(NO_3)_2 \cdot 6H_2O$, and any other hydrated forms or mixtures. $CuCl_2$ includes both anhydrous $CuCl_2$ and $CuCl_2 \cdot 2H_2O$.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopes of nickel include $^{58}Ni$, $^{60}Ni$, $^{61}Ni$, $^{62}Ni$, and $^{64}Ni$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

According to a first aspect, the present disclosure relates to a method for treating a subterranean carbonate formation. The method comprises contacting a carbonate formation rock within the formation with a composition comprising nanoparticles of $Ca(OH)_2$ dispersed in an organic solvent. This contacting forms a treated rock. The contacting may be maintained for a time period of 12-72 h, 16-60 h, 20-56 h, 24-55 h, 36-50 h, preferably 40-50 h, or about 48 h. The composition may be introduced at an injection flow rate that may be constant or varied, but is no higher than 250 L/s or 0.25 $m^3$/s, or is preferably 5-200 L/s, more preferably 10-150 L/s, even more preferably 50-100 L/s. The composition may be injected at a pressure that is constant or varied, but is no higher than 20,000 psi, or is preferably 1,000-15,000 psi, 1,500-10,000 psi more preferably 2,500-8,500 psi, even more preferably 5,000-7,500 psi, or 500-1,000 psi, or 250-2,000 psi.

The contacting forms a treated rock having a hardness that is at least 5% greater, at least 10% greater, at least 11% greater, at least 12% greater, at least 13% greater, at least 14% greater, at least 14.5% greater, or at least 15% greater than the carbonate formation rock. In one embodiment, the hardness of the treated rock is 12-80% greater, 13-75% greater, 14-70% greater, 14.5-65% greater, or 15-60% greater than the carbonate formation rock. In one embodiment, the hardness of the treated rock is about 14-15% greater, or about 14.5% greater. In one embodiment, the hardness is determined by measuring Young's modulus.

In other embodiments, the general strengthening of the treated rock may be evident by other related parameters. For instance, the stiffness, strength, geometric stiffness, hardness, and/or toughness may be determined and may show similar percentage increases with the treatment.

In one embodiment, the hardness (or stiffness, toughness, etc.) of the carbonate formation rock and the treated rock may be measured and compared at the same location on the rock or at substantially similar locations, for instance, the locations being within 5 mm of each other. In another embodiment, the hardness (or stiffness, toughness, etc.) may be measured at several locations so that a mean or average may be calculated. In one embodiment, the carbonate formation rock may have a mean hardness or stiffness in a range of 2-9 GPa, preferably 3-8 GPa, more preferably 4-7 GPa, even more preferably 5-6 GPa, or about 5.6 GPa. In one embodiment, the treated rock may have a mean hardness or stiffness in a range of 4-10 GPa, preferably 5-9 GPa, more preferably 6-8 GPa, even more preferably 6-7 GPa, or about 6.4 GPa. In one embodiment, the mean hardness or mean stiffness of the treated rock may be greater than the carbonate formation rock by 0.1-3.0 GPa, preferably 0.2-2.0 GPa, more preferably 0.4-1.0 GPa, even more preferably 0.6-1.0 GPa, or about 0.8 GPa.

In one embodiment, a hardness measurement (or stiffness, toughness, etc.) of the treated rock may be at least 1.1 times, at least 2.0 times, at least 2.5 times, at least 3.0 times, at least 3.5 times that of a respective measurement of the carbonate formation rock. In an alternative embodiment, a hardness measurement may be performed by placing broken particles of the carbonate formation rock or the treated rock within a tester.

In one embodiment, the treated rock is less prone to fracture collapse, and thus fracture conductivity and recovery is maintained at a higher level compared to a carbonate formation rock that was not contacted with the composition. In another embodiment, a treated rock improves the efficiency of a proppant in maintaining fracture conductivity and for reducing proppant embedment and crushing.

In one embodiment, the subterranean carbonate formation is part of a reservoir or petroleum reservoir. For purposes of the present disclosure, the terms "reservoir", "oil reservoir" and "petroleum reservoir" refer to a component of a petroleum system (i.e. hydrocarbon or petroleum-generating and storing geologic system) that is composed of a subsurface body of rock formations having sufficient porosity and permeability to store and transmit fluids. Sedimentary rocks are the most common reservoir rocks because they have more porosity than most igneous and metamorphic rocks and form under temperature conditions at which hydrocarbons can be preserved. Depending on the type of sedimentary rock, reservoirs can be classified as carbonate reservoirs having predominantly limestones and sandstone reservoirs having primarily siliclastic rocks and clay. In general, carbonate reservoirs tend to have lower primary permeability and salinity compared to sandstone reservoirs.

In one embodiment, the carbonate formation rock comprises at least 85 wt %, preferably at least 87 wt %, more preferably at least 90 wt %, even more preferably at least 95 wt % carbonate salts relative to a total weight. The carbonate salts may comprise magnesium carbonate and/or calcium carbonate. For instance, the carbonate salts may comprise dolomite, magnesite, calcite, aragonite, huntite, hydromagnesite, ikaite, lansfordite, monohydrocalcite, and/or vaterite.

In one embodiment, the carbonate formation rock comprises at least 85 wt %, preferably at least 87 wt %, more preferably at least 90 wt %, even more preferably at least 95 wt % calcium carbonate relative to a total weight. In a further embodiment, at least 60 wt %, at least 70 wt %, at least 80 wt %, or at least 90 wt % of the calcium carbonate is calcite.

Calcium carbonate exists in different phases and morphologies, for example, vaterite, calcite, and aragonite. Calcium carbonate may also be amorphous, or exist as a combination of more than one phase. Vaterite is a metastable phase of calcium carbonate at ambient conditions at the surface of the earth and belongs to the hexagonal crystal system. Vaterite is less stable than either calcite or aragonite, and has a higher solubility than either of these phases. Therefore, once vaterite is exposed to water, it may convert to calcite (for example, at low temperature) or aragonite (for example, at high temperature: −60° C.). There are other pathways and methods for conversion of one to the other as well, and the above are presented merely as examples. The vaterite form is uncommon because it is generally thermodynamically unstable.

The calcite form of calcium carbonate is the most stable form and the most abundant in nature and may have one or more of several different shapes, for example, rhombic and scalenohedral shapes. The rhombic shape is the most common and may be characterized by crystals having approximately equal lengths and diameters, which may be aggregated or unaggregated. Calcite crystals are commonly trigonal-rhombohedral. Scalenohedral crystals are similar to double, two-pointed pyramids and are generally aggregated.

The aragonite form of calcium carbonate is metastable under ambient temperature and pressure, but can be converted to calcite, for example, at elevated temperatures and pressures. The aragonite crystalline form may be characterized by acicular, needle- or spindle-shaped crystals, which can be aggregated, and which typically exhibit high length-to-width or aspect ratios. For instance, aragonite may have an aspect ratio ranging from about 3:1 to about 15:1. Aragonite may be produced, for example, by the reaction of carbon dioxide with $Ca(OH)_2$.

In one embodiment, the method of contacting the carbonate formation rock with the composition may increase or decrease the phase morphology of the rock. For instance the calcium carbonate of the treated rock may comprise 5-100%, 10-90%, 20-70%, or 30-50% more vaterite than the calcium carbonate of the carbonate formation rock before being contacted.

In one embodiment, the contacting may deposit additional $CaCO_3$ on the carbonate formation rock. For instance, of the total surface area in contact with the composition, 10-95 area %, 15-80 area %, 20-70 area %, 30-50 area % may have $CaCO_3$ deposited during the contacting.

In a related embodiment, the carbonate formation rock may have an exposed surface area, or surface area in fluid communication with a wellbore, that is at least 85%, preferably at least 87%, more preferably at least 90%, even more preferably at least 95% carbonate salts relative to a total exposed surface area. Similarly, the carbonate formation rock may have an exposed surface area, or surface area in fluid communication with a wellbore, that is at least 85%, preferably at least 87%, more preferably at least 90%, even more preferably at least 95% calcium carbonate relative to a total exposed surface area.

For purposes of the present disclosure, the term "permeability" refers to the ability, or measurement of a reservoir rock ability, to transmit fluids and is typically measured in darcies (D) or millidarcies (mD). Formations that transmit fluids readily, such as sandstones, are described as permeable and tend to have many large, well-connected pores. Impermeable formations tend to be finer grained or of a mixed grain size, with smaller, fewer, or less interconnected pores. As used herein, a "low-permeability reservoir" refers to an oil reservoir having a range of permeability that is no higher than 10 mD, or is preferably 0.05-10 mD, more preferably 0.1-7.5 mD, even more preferably 0.5-5 mD, most preferably 1-5 mD. Accordingly, as used herein a "high-permeability reservoir" refers to an oil reservoir having a range of permeability that is higher than 10 mD.

In one embodiment, the carbonate formation rock has a permeability in a range of 4-10 mD, preferably 5-9 mD, more preferably 6-8 mD. In one embodiment, the carbonate formation rock has a permeability in a range of 8-22 mD, preferably 10-20 mD, more preferably 12-18 mD, even more preferably 14-16 mD.

In one embodiment, the treated rock has a permeability that is decreased by 40-80%, preferably 45-75%, more preferably 50-70%, even more preferably 55-65% relative to a permeability of the carbonate formation rock. Example changes in permeability are shown in Table 3.

For purposes of the present disclosure, the term "porosity" refers to the percentage or ratio of void space to the pore volume (PV) of a rock, or that total volume within the rock that can contain or hold fluids, which is typically no more than 20-25% for both sandstone and carbonate reservoirs. "Total porosity" is the total void space in the rock whether or not it contributes to fluid flow. Thus, effective porosity is typically less than total porosity. In one embodiment, the treated rock has a total porosity or effective porosity that is decreased by 40-80%, preferably 45-75%, more preferably 50-70%, even more preferably 55-65% relative to a total porosity or effective porosity of the carbonate formation rock.

In one embodiment, in terms of wellbore productivity, a decrease in permeability and/or porosity is outweighed by the increased recovery of reservoir fluids by maintaining a fracture length and conductivity.

As mentioned previously, the composition comprises nanoparticles of $Ca(OH)_2$ dispersed in an organic solvent. In one embodiment, the composition comprises the nanoparticles at a concentration in a range of 5-50 g/L, preferably 10-45 g/L, more preferably 15-35 g/L, even more preferably 20-30 g/L, or about 25 g/L.

In one embodiment, the nanoparticles have an average longest dimension in a range of 70-120 nm, preferably 75-115 nm, more preferably 80-110 nm, even more preferably 85-105 nm. The nanoparticles may be in any variety of morphologies and shapes including, but not limited to, nanoparticles, nanosheets, nanoplatelets, nanocrystals, nanospheres, nanowires, nanofibers, nanoribbons, nanorods, nanotubes, nanocylinders, nanogranules, nanowhiskers, nanoflakes, nanofoils, nanopowders, nanoboxes, nanostars, tetrapods, nanobelts, nanoflowers, etc. and mixtures thereof.

Preferably the nanoparticles are in the form of nanoplatelets, having an average thickness in a range of 0.2-5 nm, 0.3-3 nm, or 0.4-2 nm. In one embodiment, the nanoparticles are in the form of hexagonal nanoplatelets.

In one embodiment, the nanoparticles are monodisperse, having a coefficient of variation or relative standard deviation, expressed as a percentage and defined as the ratio of the particle longest dimension standard deviation (a) to the particle longest dimension mean (p), multiplied by 100%, of less than 25%, preferably less than 10%, preferably less than 8%, preferably less than 6%, preferably less than 5%. In a preferred embodiment, the nanoparticles are monodisperse having a particle longest dimension distribution ranging from 80% of the average particle longest dimension to 120% of the average particle longest dimension, preferably 85-115%, preferably 90-110% of the average particle longest dimension. In another embodiment, the nanoparticles are not monodisperse.

In one embodiment, the nanoparticles comprise at least 95 wt %, at least 99 wt %, at least 99.9 wt %, or about 100 wt % or 100 wt % $Ca(OH)_2$ relative to a total weight of the nanoparticles. In one embodiment, the nanoparticles comprise at least 95 wt %, at least 99 wt %, at least 99.9 wt %, or about 100 wt % or 100 wt % CaO and $Ca(OH)_2$ relative to a total weight of the nanoparticles. In one embodiment, the nanoparticles comprise at least 95 wt %, at least 99 wt %, at least 99.9 wt %, or about 100 wt % or 100 wt % $CaCO_3$, CaO, and $Ca(OH)_2$ relative to a total weight of the nanoparticles.

Calcium hydroxide (traditionally called slaked lime) is an inorganic compound with the chemical formula $Ca(OH)_2$. It is a colorless crystal or white powder and is produced when quicklime (calcium oxide) is mixed, or slaked with water. It has many names including hydrated lime, caustic lime, builders' lime, slack lime, cal, or pickling lime. Calcium hydroxide is used in many applications, including food preparation, where it has been identified as E number E526. Limewater is the common name for a saturated solution of calcium hydroxide.

In one embodiment, the organic solvent may include ethers (e.g. diethyl ether, tetrahydrofuran, 1,4-dioxane, tetrahydropyran, t-butyl methyl ether, cyclopentyl methyl ether, di-iso-propyl ether), glycol ethers (e.g. 1,2-dimethoxyethane, diglyme, triglyme), alcohols (e.g. methanol, ethanol, trifluoroethanol, n-propanol, i-propanol, n-butanol, i-butanol, t-butanol, n-pentanol, i-pentanol, 2-methyl-2-butanol, 2-trifluoromethyl-2-propanol, 2,3-dimethyl-2-butanol, 3-pentanol, 3-methyl-3-pentanol, 2-methyl-3-pentanol, 2-methyl-2-pentanol, 2,3-dimethyl-3-pentanol, 3-ethyl-3-pentanol, 2-methyl-2-hexanol, 3-hexanol, cyclopropyl-methanol, cyclopropanol, cyclobutanol, cyclopentanol, cyclohexanol), aromatic solvents (e.g. benzene, o-xylene, m-xylene, p-xylene, mixtures of xylenes, toluene, mesitylene, anisole, 1,2-dimethoxybenzene, $\alpha,\alpha,\alpha$-trifluoromethylbenzene, fluorobenzene), chlorinated solvents (e.g. chlorobenzene, dichloromethane, 1,2-dichloroethane, 1,1-dichloroethane, chloroform), ester solvents (e.g. ethyl acetate, propyl acetate), amide solvents (e.g. dimethylformamide, dimethylacetamide, N-methyl-2-pyrrolidone), urea solvents, ketones (e.g. acetone, butanone), acetonitrile, propionitrile, butyronitrile, benzonitrile, dimethyl sulfoxide, ethylene carbonate, propylene carbonate, 1,3-dimethyl-3,4, 5,6-tetrahydro-2(1H)-pyrimidinone, non-polar solvents (e.g. hexane, benzene, toluene, diethyl ether, chloroform, 1,4-dioxane), polar aprotic solvents (e.g. ethyl acetate, tetrahydrofuran, dichloromethane, acetone, acetonitrile, dimethylformamide, dimethyl sulfoxide), polar protic solvents (e.g. acetic acid, n-butanol, isopropanol, n-propanol, ethanol, methanol, formic acid), and mixtures thereof. In a preferred embodiment, the organic solvent is ethanol, methanol, or isopropanol. Preferably the organic solvent is isopropanol.

In one embodiment, the organic solvent is in a liquid state at room temperature (20-27° C.). The organic solvent may be a linear or branched alkane with a general formula of $C_nH_{2n+2}$, where n may have a value of 5-18, preferably 10-17, more preferably 12-16. In another embodiment, the nonpolar compound may have a surface tension at 19-22° C. of 10-50 mN/m, preferably 15-40 mN/m, more preferably 20-35 mN/m. In other embodiments, the organic solvent may be some other organic molecule with a nonpolar or hydrophobic character and similar surface tension. In other embodiments, the organic solvent may be a mixture of organic molecules, for instance, a plant-based oil or a petroleum product such as mineral oil. In one embodiment, the organic solvent is at least one selected from the group consisting of hexane, heptane, octane, toluene, xylene, benzene, cycloheptane, cyclohexane, cyclohexene, dodecane, methylcyclohexane, toluene, octadecene, turpentine, pentane, cyclopentane, pentamethylbenzene, tridecane, white spirits, mineral spirits, petroleum ethers, petroleum spirits, petroleum benzine, and a petroleum-derived liquid. In one embodiment, the organic solvent is, or comprises, a petroleum-derived liquid or a petroleum product, such as crude oil, ligroin, kerosene, paraffin oil, motor oil, dimethyl ether, biodiesel, gasoline, diesel, heating oil, jet fuel, naptha, tar, and/or some other natural gas condensate or petroleum distillate. In one embodiment, the organic solvent is gasoline (petrol) and/or diesel. In one embodiment, the organic solvent is a mixture of at least two, at least three, at least four, at least five, or at least six compounds such as those previously described.

In one embodiment, the organic solvent may be present in an emulsion, preferably an oil-in-water emulsion where the organic solvent is considered the oil phase. In a further embodiment, the oil or organic solvent is a petroleum product. An emulsion is a mixture of two or more liquids that are normally immiscible (unmixable or unblendable). Two liquids can form different types of emulsions. As an example, oil and water can form, first, an oil-in-water emulsion, wherein the oil is the dispersed phase, and water is the continuous phase. Second, they can form a water-in-oil emulsion, wherein water is the dispersed phase and oil is the continuous phase. Multiple emulsions are also possible, including a "water-in-oil-in-water" emulsion and an "oil-in-water-in-oil" emulsion.

In one embodiment, the composition does not contain water. In one embodiment, the composition contains less than 1 wt % water, preferably less than 0.1 wt % water, more preferably less than 0.01 wt % water, or less than less than 0.001 wt % water, relative to a total weight of the composition. In one embodiment, the composition may comprise a desiccant to maintain a very low water concentration, or maintain a water-free environment.

In one embodiment, the composition does not comprise $CO_2$. Similarly, the composition may comprise less than 0.1 wt %, preferably less than 0.01 wt %, less than 0.001 wt %, less than 0.0001 wt % $CO_2$ relative to a total weight of the composition.

In one embodiment, the composition consists of the nanoparticles of $Ca(OH)_2$ and the organic solvent. In a related embodiment, the composition consists essentially of the nanoparticles of $Ca(OH)_2$ and the organic solvent, meaning that at least 99.5 wt %, at least 99.9 wt %, at least 99.99 wt % or about 100 wt % of the total weight of the composition is organic solvent and $Ca(OH)_2$ nanoparticles.

Without being bound by any theory, the treated rock may be strengthened by the composition undergoing a carbonatation reaction which forms and deposits calcium carbonate on the rock surface. Carbonatation is a chemical reaction in which calcium hydroxide reacts with carbon dioxide and forms insoluble calcium carbonate: $Ca(OH)_2 + CO_2 \rightarrow CaCO_3 + H_2O$. In one embodiment, the composition does not contain $CO_2$ or any source of carbonate, and the $CO_2$ for the carbonatation reaction is supplied solely by the carbonate formation rock. In another embodiment, the composition contains $CO_2$ or some other source of carbonate, or alternatively, the composition is contacted with the carbonate formation rock, and then a second composition containing $CO_2$ and/or a carbonate source is contacted. In one embodiment, some $Ca(OH)_2$ nanoparticles may enter and settle within a pore or fracture of the carbonate formation rock.

In an alternative embodiment, the composition may comprise an acid in order to react with the carbonate formation rock to form a source of $CO_2$ for the carbonatation reaction. The acid may be a weak organic acid such as citric acid, formic acid, acetic acid, propionic acid, butyric acid, valeric acid, caproic acid, oxalic acid, lactic acid, malic acid, benzoic acid, and carbonic acid.

In another embodiment, the carbonate formation rock is subjected to acid fracturing before the contacting with the composition. Thus, the method may further comprise acid fracturing the carbonate formation rock before the contacting. In this instance, $CO_2$ may be evolving from the acid fracturing process at the time the carbonate formation rock is contacted with the composition. In one embodiment, the contacting with the composition is performed after acid fracturing that does not use a water flush. In another embodiment, the contacting with the composition may be done after a water flush following the acid fracturing.

In an alternative embodiment, the nanoparticles of $Ca(OH)_2$ may be encapsulated within a capsule having a polymeric shell. The capsules may be delivered to the carbonate formation rock where reservoir temperature may thermally degrade the polymeric shell, thus releasing the nanoparticles of $Ca(OH)_2$ to contact the rock. In one embodiment, the capsules may enclose the composition, for example, both organic solvent and $Ca(OH)_2$.

The polymeric shell may have a wall thickness that is preferably no greater than 2 m or 2000 nm, or is preferably 25-1000 nm, more preferably 50-750 nm, even more preferably 100-500 nm, so that the wall can rupture easily to release the contents when subjected to the high temperatures of the reservoir or wellbore. In one embodiment, the capsule is of a generally spherical or round shape having a diameter range of 0.1-50 µm, preferably 0.2-20 µm, 0.5-20 µm, 1.0-20 µm, 5-20 µm, 10-20 µm, 15-20 µm, more preferably 0.1-10 µm, 0.1-5.0 µm, 0.2-5.0 µm, even more preferably 0.1-2.0 µm, 0.2-2.0 µm, 0.5-2.0 µm, 1.0-2.0 µm, most preferably 0.1-1.0 µm, 0.2-1.0 µm, 0.1-0.5 µm, 0.2-0.5 µm. In another embodiment, the capsule is oval or rod-shaped where the large diameter (for the oval) or length (for the rod) ranges from 0.5-75 µm, preferably 1.0-60 µm, 5.0-50 µm, more preferably 7.5-30 µm, 10-30 µm, 10-25 µm, 15-25 µm while the small diameter or width ranges from 0.05-20 µm, preferably 0.1-10 µm, more preferably 0.1-5.0 µm, 0.2-5.0 µm, 0.5-5.0 µm, 0.1-2.5 µm, 0.2-2.5 µm, 0.5-2.5 µm. Generally, if a reservoir has low permeability, the oil recovery process in accordance with the present disclosure may require the capsules to have a smaller size. The capsule can also assume other common shapes such as oblong, bullet, tubular, and even less common geometrical shapes like square, rectangular, triangular, and cylindrical.

To avoid adding undesirable impurities to the extracted reservoir fluids, the polymeric capsule shell may be advantageously free of elements such as but not limited to silicon, phosphorus, fluorine, bromine, chlorine and sulfur. Acceptable elements of the polymer shell include carbon, hydrogen, oxygen and nitrogen.

To accelerate the degradation rate of a capsule, the polymeric shell may be advantageously free of chemical crosslinking agents. As used herein, "chemical crosslinkers" or "chemical crosslinking agents" are molecules that form thermally stable covalent bonds or chemical crosslinks with two or more polymer chains in a polymer, to link one polymer chain to another, in order to promote mechanical strength and thermal stability of the polymer. Examples of crosslinkers commonly used in manufacturing of polymers include 4-vinylbenzocyclobutene, trimethylolpropane ethoxylate, triethylene glycol dimethacrylate, poly(ethylene glycol) diacrylate, poly(ethylene glycol) bisazide, 1,4-phenylenediacryloyl chloride, pentaerythritol propoxylate, pentaerythritol ethoxylate, 1,1-maleimidoundecanoic acid, hexa (ethylene glycol) dithiol, glycerol ethoxylate, p-divinylbenzene, divinylbenzene, 1,4-bis(4-vinylphenoxy) butane and bis(2-methacryloyl)oxyethyl disulfide. Molecules that form heat-reversible physical crosslinks such as hydrogen bonds between polymer chains may be acceptable to incorporate into the polymeric capsule shell, but are not required.

Once placed deep inside the oil reservoir, the capsules are left to incubate in the natural reservoir temperature which will trigger breakdown of the capsules to release the contents. This process may be described as thermal physical degradation or thermal decomposition.

For purposes of the present disclosure, the term "thermal physical degradation" refers to a process whereby the action of heat or elevated temperature on a polymer causes a change or loss of physical, mechanical and/or electrical properties.

For purposes of the present disclosure, the term "thermal decomposition" or "thermal chemical degradation" refers to a process of chemical species change in a polymer that is caused by heat, which involves scission of one or more covalent bonds such as but not limited to a carbon-carbon bond (single, double or triple), a carbon-hydrogen bond, a carbon-oxygen bond (single or double), a carbon-nitrogen bond, an ester bond, or an amide bond.

Reservoir temperature is primarily governed by the reservoir's proximity to the earth's mantle, and by the relative heat exchange capacities and thermal conductivities of the formations. The reservoir temperature may range from 50-120° C., with an average temperature of 75-85° C. The capsules may be incubated for at least 12 h, preferably 12-36 h, more preferably 18-30 h, even more preferably 20-28 h, most preferably 22-26 h, or for the length of time as previously described for contacting with the composition.

In another embodiment, capsules may be used to encapsulate an acid, such as weak acid listed above, or a strong acid such as hydrochloric acid, hydrobromic acid, sulfuric acid, sulfamic acid, phosphoric acid, and nitric acid. In another embodiment, the capsules may be used to encapsulate any other additive or compound listed within this disclosure.

In one embodiment, the composition further comprises a proppant. The proppant may be particles of alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, pyroelectric crystals, sand (e.g. quartz sand grains), sintered bauxite, bauxite grains, walnut shell fragments, aluminum pellets, nylon pellets, calcium carbonate, other sized salts, glass, ceramic beads, and the like, and mixtures thereof. Specific suitable piezoelectric crystal particles may include, but are not necessarily limited to, ZnO, berlinite ($APO_4$), lithium tantalate ($LiTaO_3$), gallium orthophosphate ($GaPO_4$), $BaTiO_3$, $SrTiO_3$, $PbZrTiO_3$, $KNbO_3$, $LiNbO_3$, $LiTaO_3$, $BiFeO_3$, sodium tungstate, $Ba_2NaNb_5O_5$, $Pb_2KNb_5O_{15}$, potassium sodium tartrate, tourmaline, topaz and mixtures thereof. In one embodiment, the proppant may have a diameter in a range of 1 μm-3 mm, preferably 10 μm-1 mm, more preferably 20 μm-500 μm, even more preferably 50 μm-400 μm, 60-300 μm, 70-250 μm. In another embodiment, the proppant may have a diameter in a range of 10 nm-1 μm, 20-800 nm, 30-700 nm, 40-600 nm, 50-500 nm, 60-400 nm.

In one embodiment, the composition may further comprise an additive selected from the group consisting of surfactants, mutual solvents, anti-sludge agents, water-wetting or emulsifying surfactants, corrosion inhibitor intensifiers, foaming agents, viscosifiers, wetting agents, diverting agents, oxygen scavengers, carrier fluids, fluid loss additives, friction reducers, stabilizers, rheology modifiers, gelling agents, scale inhibitors, breakers, salts, brines, pH control additives, particulates, crosslinkers, salt substitutes, relative permeability modifiers, sulfide scavengers, fibers, and nanoparticles.

In one embodiment, the composition may further comprise a surfactant. The surfactant may be an ionic surfactant, a non-ionic surfactant, or a biological surfactant.

Exemplary ionic surfactants include, but are not limited to, (1) anionic (based on sulfate, sulfonate or carboxylate anions), for example, perfluorooctanoate (PFOA or PFO), perfluorooctanesulfonate (PFOS), sodium dodecyl sulfate (SDS), ammonium lauryl sulfate, and other alkyl sulfate salts, sodium laureth sulfate (SLS, and also known as sodium lauryl ether sulfate (SLES)), alkyl benzene sulfonate, soaps, and fatty acid salts; (2) cationic (based on quaternary ammonium cations), for example, cetyl trimethylammonium bromide (CTAB) (also known as hexadecyl trimethyl ammonium bromide), and other alkyltrimethylammonium salts, cetylpyridinium chloride (CPC), polyethoxylated tallow amine (POEA), benzalkonium chloride (BAC), and benzethonium chloride (BZT); and (3) zwitterionic (amphoteric), for example, dodecyl betaine, cocamidopropyl betaine, and coco ampho glycinate.

Exemplary nonionic surfactants include, but are not limited to, alkyl poly(ethylene oxide), alkylphenol poly(ethylene oxide), copolymers of poly(ethylene oxide) and poly(propylene oxide) (commercially known as Poloxamers or Poloxamines), polyoxyethylene octyl phenyl ether (TRITON X-100®), alkyl polyglucosides, for example, octyl glucoside and decyl maltoside, fatty alcohols, for example, cetyl alcohol and oleyl alcohol, cocamide MEA, cocamide DEA, and polysorbates (commercially known as TWEEN 20, TWEEN 80), for example, dodecyl dimethylamine oxide.

Exemplary biological surfactants include, but are not limited to, micellular-forming surfactants or surfactants that form micelles in solution, for example, DNA, vesicles, phospholipids, and combinations thereof.

In one embodiment, the composition may comprise a carbonate or a bicarbonate. The carbonate may be a salt or species having the anion $CO_3^{2-}$. The bicarbonate may be a salt or species having the anion $HCO_3^{1-}$. Example carbonates and bicarbonates include but are not limited to sodium bicarbonate, sodium carbonate, magnesium bicarbonate, magnesium carbonate, calcium bicarbonate, calcium carbonate, barium bicarbonate, barium carbonate, lithium bicarbonate, lithium carbonate, potassium bicarbonate, potassium carbonate, and carbonic acid.

In one embodiment, the composition may comprise $CO_2$. The $CO_2$ may be dissolved in the composition to form carbonic acid and/or may be present as gas bubbles. In a related embodiment, the composition may comprise foamed $CO_2$, meaning that the composition is a foam or a colloidal suspension of $CO_2$ gas bubbles in a liquid. To support the bubble formation, the composition may further comprise a surfactant. Where the composition comprises foamed $CO_2$, the total $CO_2$ may be present at a volume percentage in a range of 1-99.9 vol %, preferably 2-90 vol %, more preferably 5-80 vol %, or 5-10 vol %, 10-20 vol %, 20-30 vol %, 30-40 vol %, 40-50 vol %, 50-60 vol %, 60-70 vol %, 70-80 vol %, or 80-90 vol % relative to a total volume of the composition.

In one embodiment, the composition is foamed $CO_2$ and may comprise 3-30 vol %, 5-25 vol % liquid phase and nanoparticles of $Ca(OH)_2$, 70-98 vol %, 75-95 vol % $CO_2$, and 1-7 vol %, 2-6 vol % surfactant, each relative to a total volume of the composition. In one embodiment, the composition is foamed $CO_2$ and may comprise 3-30 wt %, 5-25 wt % liquid phase and nanoparticles of $Ca(OH)_2$, 70-98 wt %, 75-95 wt % $CO_2$, and 1-7 wt %, 2-6 wt % surfactant, each relative to a total weight of the composition.

In one embodiment, the proppant, additive, surfactant, carbonate, bicarbonate, and/or $CO_2$ may be present in the composition at a concentration in a range of 0.001-50 wt %, preferably 0.005-40 wt %, more preferably 0.01-30 wt %, 0.05-20 wt %, 0.1-15 wt %, 0.2-12 wt %, 0.3-10 wt %, 0.4-9 wt %, 0.1-20 wt %, 0.2-15 wt %, 0.5-10 wt %, 1.0-10.0 wt %, 2-8 wt %, 3-7 wt %, or 0.5-5 wt %, relative to a total weight of the composition. In one embodiment, the composition may comprise water at any of the above concentration ranges. In one embodiment, foamed $CO_2$ may comprise water.

In one embodiment, the method for treating the subterranean carbonate formation may further comprise a step of injecting $CO_2$ into the reservoir or wellbore for the purpose of contacting the carbonate formation rock or the treated rock. The $CO_2$ may be injected before and/or after the contacting with the composition. The $CO_2$ may be injected at a pressure that is constant or varied, but is no higher than 20,000 psi, or is preferably 1,000-15,000 psi, 1,500-10,000 psi more preferably 2,500-8,500 psi, even more preferably 5,000-7,500 psi, or 500-1,000 psi, or 250-2,000 psi. The $CO_2$ may be introduced as foamed $CO_2$ or dissolved in a liquid as previously described. The $CO_2$ may also be injected as a gas or introduced by any technique known in the art of carbon sequestration.

In one embodiment, any proppant, capsule, $Ca(OH)_2$ nanoplatelet, or other solid compound may further comprise a coating agent. Suitable coating agents include, but are not necessarily limited to, water, brines, glycols, glycol ethers, alcohols, ketones, terpenes, alkyl esters, aromatic compounds, mineral oils or other refined hydrocarbons that accomplishes the purposes of the methods and compositions described herein. The brine may have a wide salinity range of 500-200,000 ppm, preferably 1,000-100,000 ppm, more preferably 2,500-75,000 ppm. Minerals contained in the brine solution include but are not limited to chloride, sodium, sulfate, magnesium, calcium, potassium, bicarbonate, carbonate, bromide, boron, strontium and fluoride. Specific, non-limiting examples of suitable glycols include, but are not necessarily limited to, propylene glycol, and the like dipropylene glycol, tripropylene glycol, polypropylene glycol, ethylene glycol, diethylene glycol, triethylene glycol, and combinations thereof, while suitable alcohols include, but are not necessarily limited to methanol, isopropanol, 1-propanol, hexanol, butanol, octanol and combinations thereof, and suitable glycol ethers include, but are not necessarily limited to ethylene glycol monobutyl ether, ethylene glycol monohexyl ether, diethylene glycol monomethyl ether, propylene glycol monomethyl ether, propylene glycol n-butyl ether, dipropylene glycol dimethyl ether, tripropylene glycol n-butyl ether, and combinations thereof. Specific, non-limiting examples of suitable ketones include, but are not necessarily limited to acetone, diethyl ketone, methyl ethyl ketone, methyl propyl ketone, cyclohexanone and combinations thereof. Specific, non-limiting examples of suitable terpenes include d-limonene, pinene, and combinations thereof. Specific, non-limiting examples of suitable alkyl esters include, but are not necessarily limited to methyl acetate, ethyl acetate, ethyl formate, ethyl propionate, methyl benzoate, methylethyl benzoate, and combinations thereof. Specific, non-limiting examples of suitable aromatic compounds include, but are not necessarily limited to benzene, toluene, xylene, naphthalene and combinations thereof. Specific, non-limiting examples of suitable mineral oils include ConocoPhillips PURE PERFORMANCE® Base Oil, such as 225N and 600N oils. Other coating agents include sorbitan esters, ethoxylated sorbitan esters, ethoxylated alcohols, ethoxylated alkyl-phenols, alkyl-dicarboxylics, sulfosuccinates, phospholipids, alkylamines, quaternary amines, alkyl-siloxanes, and the like. It is not necessary that a resin be used as a coating agent or binder, and in one non-limiting embodiment, no resin is used. Water or brines may also be effective coating agents to help coat particles such as sand and ceramic particles. A polymer in water or brine may also be employed to help coat particles like proppant.

The examples below are intended to further illustrate protocols for increasing hardness of carbonate formation rock and are not intended to limit the claims.

Example 1

Procedure

Nanoparticles of Calcium Hydroxide $Ca(OH)_2$ immersed either in isopropanol or ethanol solutions are used to treat the rock surface.

Figure 3:
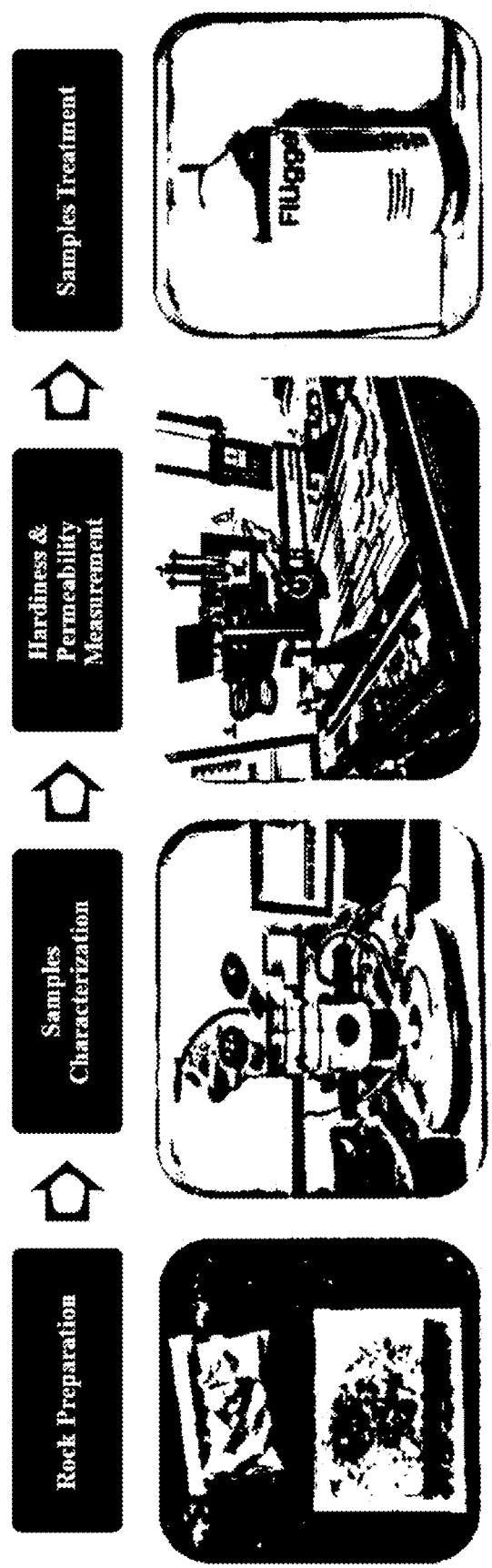
FIG. 3 shows the experimental procedure to verify the impact of chemicals on the rock surface.

The procedure of the experiment can be summarized according to FIG. 3 as follows:

1—Cutting slabs of carbonate rocks
2—Characterize the rock using SEMs
3—Auto-scan is used to measure permeability and rock hardness
4—Treat the rock surface with the chemicals
5—Repeat 2-3 steps The surface treatment can be summarized as follows:

a. Dropping 10 mL of 25 g/L isopropanol $Ca(OH)_2$ nanoparticles (hexagonal plate shape with 100 nm crystal size) solution on the sample dry surface.

b. Leaving the sample in the humid temperature chamber for 48 hrs.

c. Dropping another 10 mL of 25 g/L isopropanol $Ca(OH)_2$ nanoparticles solution on sample surface.

Example 2

Results

Figure 4A:
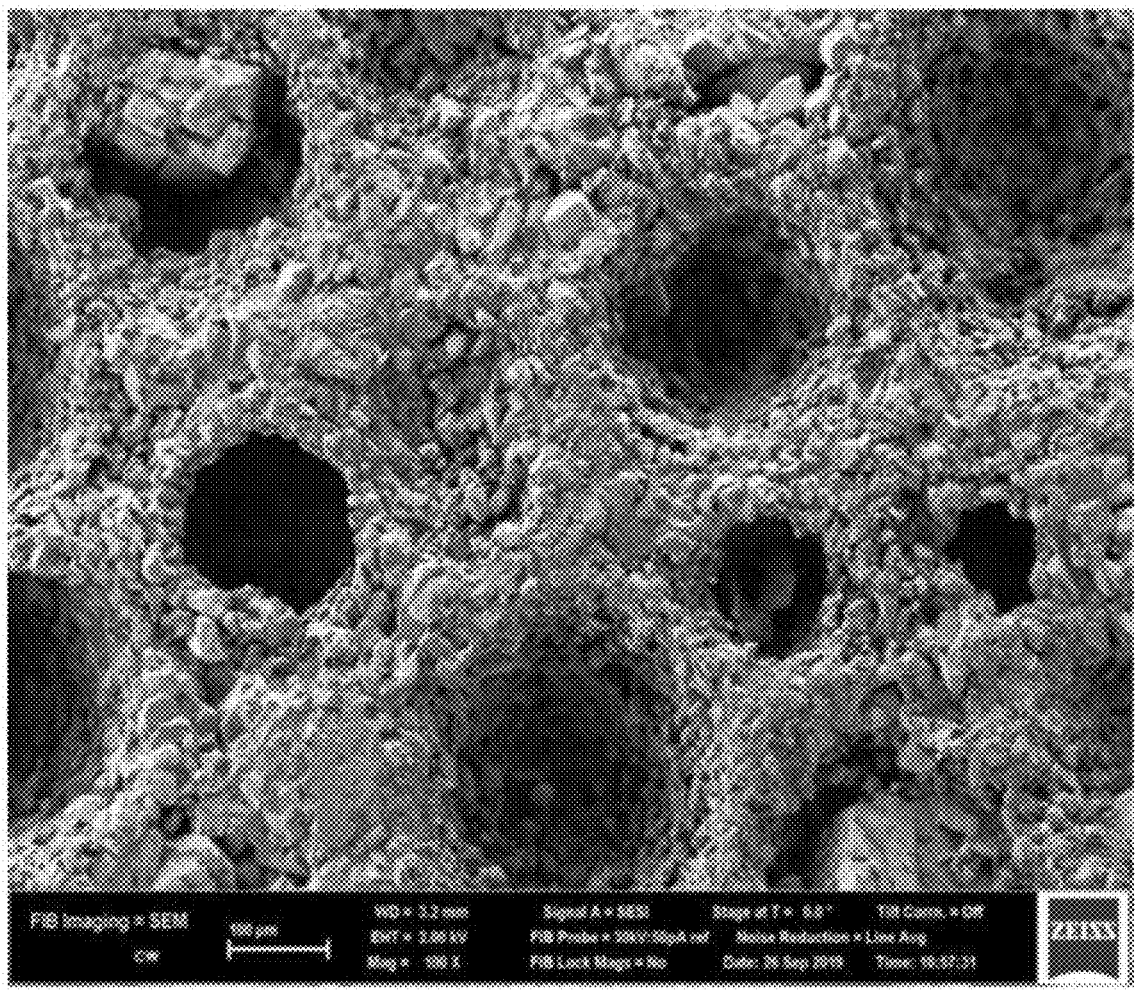
FIG. 4A shows an SEM image of a rock surface before treatment, scale bar 100 μm.
Figure 4B:
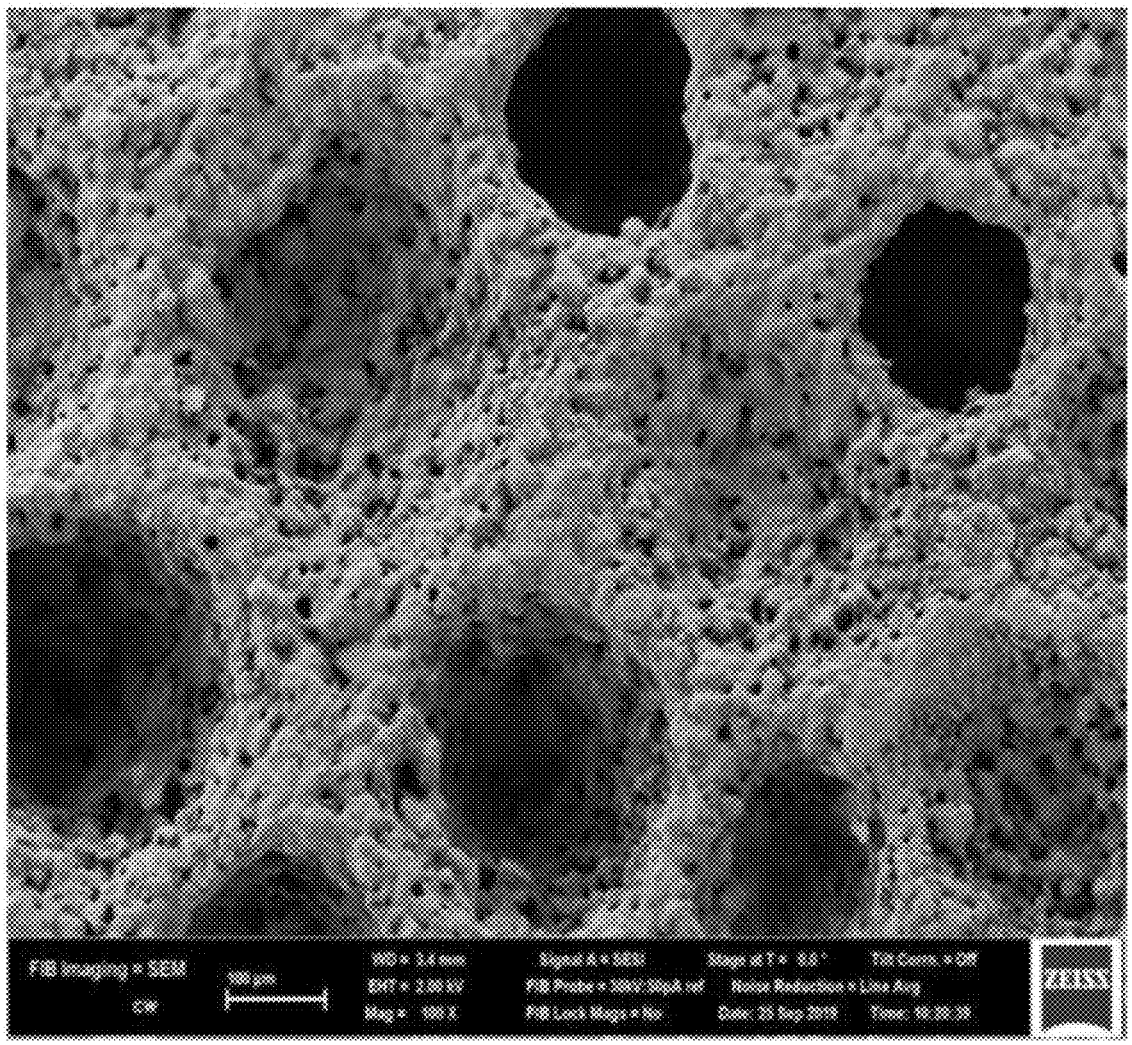
FIG. 4B shows an SEM image of a rock surface after treatment, scale bar 100 μm.
Figure 5A:
FIG. 5A shows an SEM image of a rock surface before treatment, scale bar 2 μm.
Figure 5B:
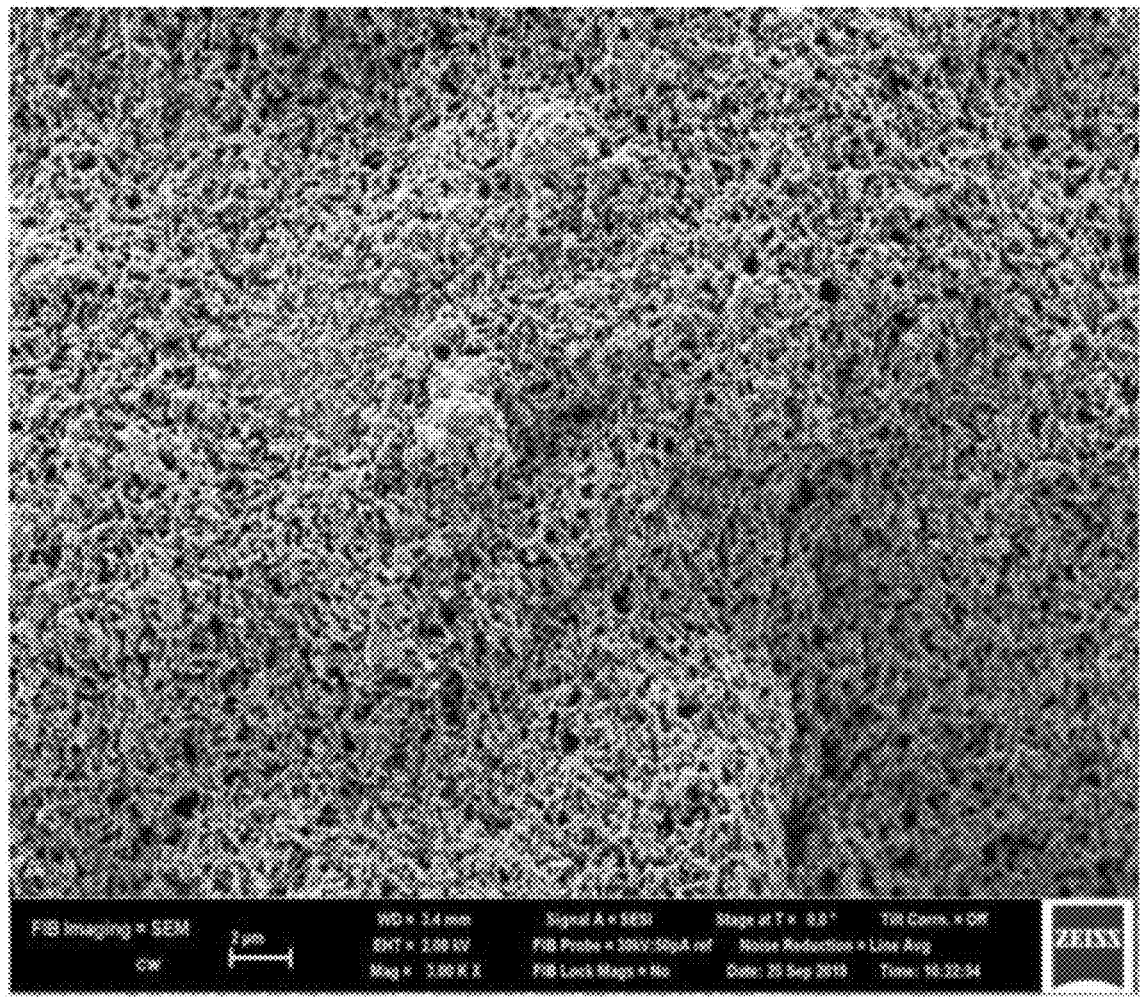
FIG. 5B shows an SEM image of a rock surface after treatment, scale bar 2 μm.

Using SEM, the rock surface before and after the treatment was characterized. Different SEM images with different magnification has been used. FIGS. 4A and 4B show the rock surface before and after treatment with 100 m scale bars, respectively. A more representative image (2 m scale bar) of the rock surface changes before and after the nanoparticle treatment is shown in FIGS. 5A and 5B, respectively. Calcium carbonate exists in different crystal structure such as calcite, portlandite, and vaterite, where each results in different rock properties. It is speculated that the nanoparticles formed a harder crystal polymorphs, such as vaterite. This is done by examining the rock hardness before and after the treatment.

Figure 6:
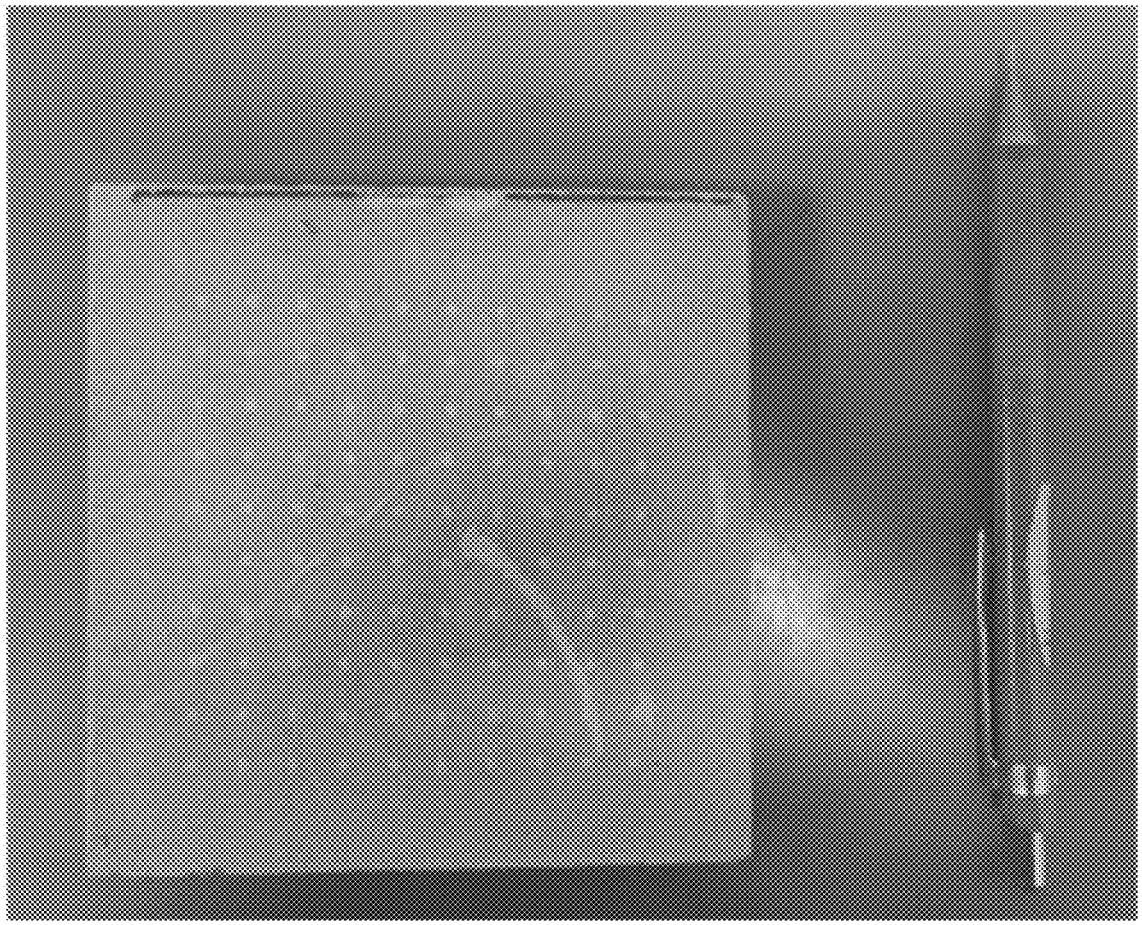
FIG. 6 shows a carbonate rock slab (10 cm×10 cm) with 100 points of hardness measurements.
Figure 7:
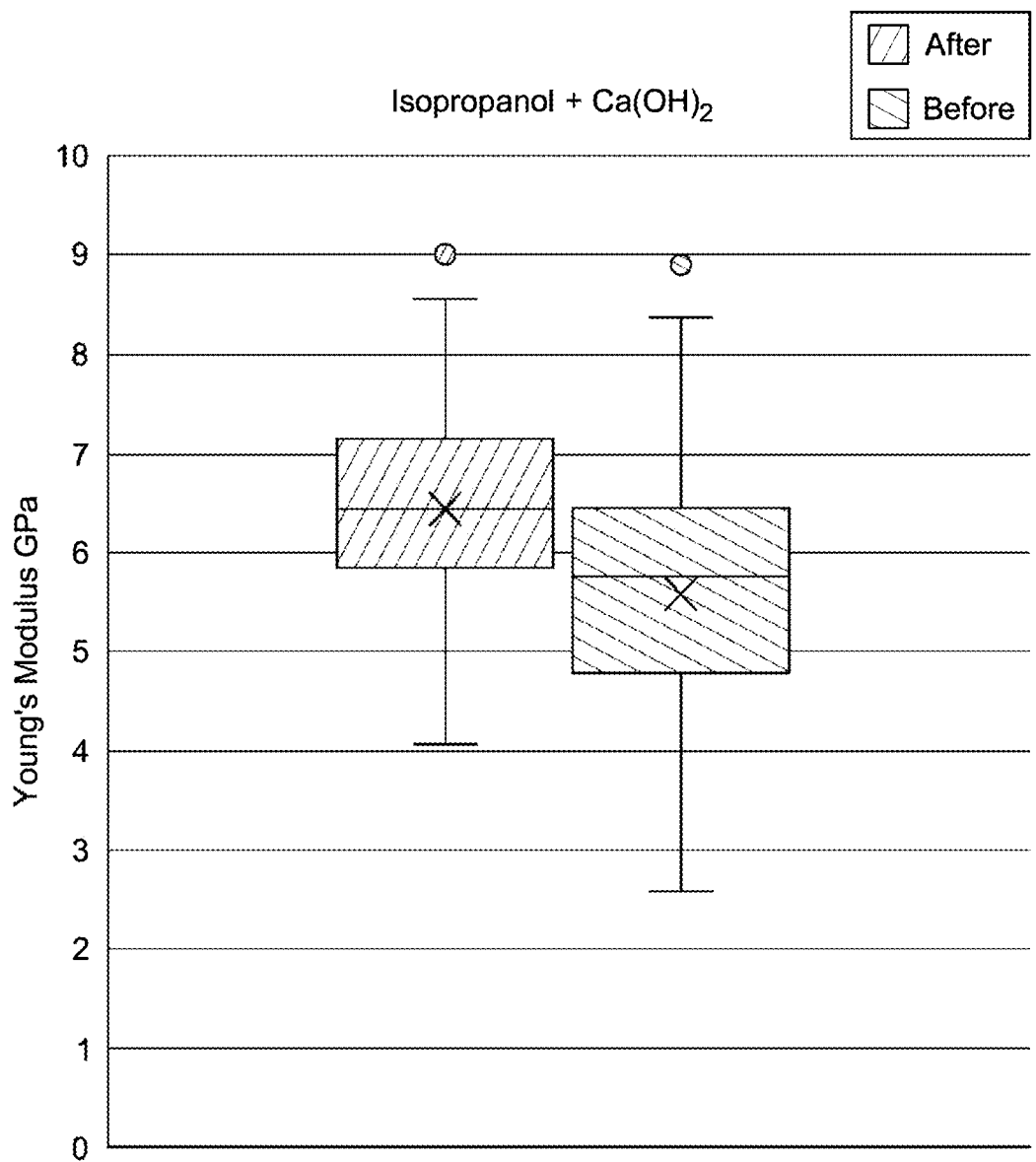
FIG. 7 shows the statistical parameters of the rock hardness before and after isopropanol $Ca(OH)_2$ treatment.

FIG. 6 shows that the rock hardness was measured at 100 points in 10 cm×10 cm rock surface. The hardness here is assessed through measurements of Young's modulus on the surface. As can be observed from the results in Table 1, the average rock hardness improved from 5.62 GPa to 6.44 GPa. What is significant is that the weakest point in the rock surface has improved from 2.58 GPa to 4.078 GPa, representing a 55% improvement in hardness. The results shown in Table 1 are also represented in FIG. 7. Tables 2 and 3 shows changes in rock hardness and permeability, respectively, of samples using different solvents.

TABLE 1

Statistical parameters of the rock hardness before and after treatment.

| | Isopropanol $Ca(OH)_2$ | |
| --- | --- | --- |
| Parameter | Before | After |
| Hardness Mean (GPa) | 5.6205015 | 6.440436 |
| Hardness Standard Deviation | 1.245469 | 1.095057 |
| Hardness Range | 6.32429 | 4.95088 |
| Minimum Hardness | 2.58154 | 4.07873 |
| Maximum Hardness | 8.90583 | 9.02961 |

TABLE 2

Change in rock hardness before and after treatment with different $Ca(OH)_2$ fluid bases.

| Sample ID | $Ca(OH)_2$ Fluid Base | Young's (GPa) Before | Young's (GPa) After | Change, GPa | Change, % |
| --- | --- | --- | --- | --- | --- |
| 3L | Ethanol | 14.70 | 16.04 | 1.34 | 9.12 |
| 3S | Ethanol | 8.10 | 8.88 | 0.77 | 9.56 |
| 4 | Isopropanol | 5.62 | 6.44 | 0.82 | 14.59 |
| 4L | Isopropanol | 15.49 | 17.93 | 2.44 | 15.77 |
| 4S | Isopropanol | 9.64 | 11.27 | 1.63 | 16.95 |
| 7L | Isopropanol (Zero Humidity) | 14.98 | 17.00 | 2.02 | 13.48 |
| 6S | Isopropanol (Zero Humidity) | 10.04 | 13.91 | 3.87 | 38.56 |

TABLE 3

Change in permeability before and after treatment
with different Ca(OH)$_2$ fluid bases.

| Sample ID | Treatment Fluid | Permeability (mD) Before | Permeability (mD) After | Change, mD | Change, % |
|---|---|---|---|---|---|
| 3L | Ethanol | 10.04 | 4.80 | −5.23 | −52.14 |
| 3S | Ethanol | 5.94 | 2.68 | −3.26 | −54.92 |
| 4L | Isopropanol | 18.69 | 9.85 | −8.84 | −47.32 |
| 4S | Isopropanol | 6.94 | 3.21 | −3.74 | −53.82 |
| 7L | Isopropanol (Zero Humidity) | 14.67 | 3.31 | −11.36 | −77.45 |
| 6S | Isopropanol (Zero Humidity) | 5.94 | 3.24 | −2.70 | −45.48 |

The invention claimed is:

1. A method for treating a fractured subterranean carbonate formation having fractures and channels, comprising:

injecting a composition comprising nanoparticles of Ca(OH)$_2$ dispersed in an organic solvent into a wellbore present in the fractured subterranean carbonate formation at a pressure of from 250 to 2,000 psi to contact a carbonate formation rock within the fractured subterranean carbonate formation with the composition, thus forming a treated rock having a hardness that is at least 10% greater than the carbonate formation rock, to thereby sustain fluid conductivity in the fractures and channels in the treated rock.

2. The method of claim 1, wherein the hardness of the treated rock is 12-80% greater than the carbonate formation rock.

3. The method of claim 1, wherein the composition comprises the nanoparticles at a concentration in a range of 5-50 g/L.

4. The method of claim 1, wherein the nanoparticles are in the form of hexagonal nanoplatelets.

5. The method of claim 1, wherein the treated rock has a permeability that is decreased by 40-80% relative to a permeability of the carbonate formation rock.

6. The method of claim 1, wherein the nanoparticles have an average longest dimension in a range of 70-120 nm.

7. The method of claim 1, wherein the injecting is maintained for a time period of 12-72 h.

8. The method of claim 1, wherein the organic solvent is isopropanol, methanol, and/or ethanol.

9. The method of claim 1, wherein the composition further comprises a proppant.

10. The method of claim 1, wherein the composition further comprises a surfactant.

11. The method of claim 1, wherein the composition further comprises a carbonate or a bicarbonate.

12. The method of claim 1, wherein the composition further comprises $CO_2$.

13. The method of claim 1, wherein the composition further comprises foamed $CO_2$.

14. The method of claim 1, wherein the composition does not contain water.

15. The method of claim 1, wherein the composition does not comprise $CO_2$.

16. The method of claim 1, further comprising:
acid fracturing the carbonate formation rock before the injecting.

17. The method of claim 1, wherein the composition consists of the nanoparticles of Ca(OH)$_2$ and the organic solvent.

18. The method of claim 1, wherein the carbonate formation rock comprises at least 85 wt % calcium carbonate relative to a total weight.

19. The method of claim 1, wherein the carbonate formation rock has a permeability in a range of 4-10 mD.

20. The method of claim 1, wherein the carbonate formation rock has a permeability in a range of 8-22 mD.

* * * * *